July 7, 1964 H. W. FULLER 3,140,471

HIGH CAPACITY DATA PROCESSING TECHNIQUES

Filed Nov. 18, 1957 8 Sheets-Sheet 1

INVENTOR
HARRISON W. FULLER

BY

Fred Jacob
ATTORNEY

INVENTOR
HARRISON W. FULLER
BY
Fred Jacob
ATTORNEY

July 7, 1964 H. W. FULLER 3,140,471

HIGH CAPACITY DATA PROCESSING TECHNIQUES

Filed Nov. 18, 1957

8 Sheets-Sheet 3

INVENTOR.
HARRISON W. FULLER

HIGH CAPACITY DATA PROCESSING TECHNIQUES

Filed Nov. 18, 1957

8 Sheets-Sheet 4

INVENTOR
HARRISON W. FULLER

BY

Fred Jacob

ATTORNEY

July 7, 1964 H. W. FULLER 3,140,471

HIGH CAPACITY DATA PROCESSING TECHNIQUES

Filed Nov. 18, 1957 8 Sheets-Sheet 5

INVENTOR
HARRISON W. FULLER

BY

Fred Jacob
ATTORNEY

July 7, 1964 H. W. FULLER 3,140,471

HIGH CAPACITY DATA PROCESSING TECHNIQUES

Filed Nov. 18, 1957 8 Sheets-Sheet 6

INVENTOR
HARRISON W. FULLER

BY Fred Jacob
ATTORNEY

July 7, 1964 H. W. FULLER 3,140,471

HIGH CAPACITY DATA PROCESSING TECHNIQUES

Filed Nov. 18, 1957

8 Sheets-Sheet 7

INVENTOR.
HARRISON W. FULLER

July 7, 1964 H. W. FULLER 3,140,471

HIGH CAPACITY DATA PROCESSING TECHNIQUES

Filed Nov. 18, 1957 8 Sheets-Sheet 8

INVENTOR.
HARRISON W. FULLER

3,140,471
HIGH CAPACITY DATA PROCESSING TECHNIQUES

Harrison W. Fuller, Needham Heights, Mass., assignor, by mesne assignments, to Laboratory for Electronics, Inc., Boston, Mass., a corporation of Delaware Filed Nov. 18, 1957, Ser. No. 697,058
14 Claims. (Cl. 340—174)

The present invention relates in general to new and improved techniques for processing data to obtain high density data storage and means for implementing these methods.

Present day large capacity data storage systems generally employ magnetic storage devices in the form of tapes, drums and disks, data usually being stored on the surfaces thereof. The data is recorded sequentially so that scanning time is involved in any data retrieval. Scanning is normally accomplished by mechanical motion. In the most advanced present day systems, a data storage density of 1000 to 1500 binary digits per inch is possible, minimum access time being of the order of 300 milliseconds.

It requires, however, the utilization of radically different techniques than those employed in conventional apparatus in order to obtain a storage density materially in excess of that which is presently possible. Certain general requirements must be met in order to accomplish this: The scanning probe, which in the case of present day magnetic recording devices consists of the magnetic head gap, must be small in space extent. The relative mechanical motion of the storage medium and of the probe should be eliminated. A minute probe having little or no dispersion must be propagated and must be capable of scanning a large number of data cells in order to minimize selection costs. Additionally, the volume of apparatus required per unit of stored data must be small. The invention which forms the subject matter of this application fulfills the above stated requirements by utilizing techniques wherein the magnetic field associated with a wall separating oppositely oriented domains of a magnetic medium is employed as a probe for scanning a storage medium.

Accordingly, it is a primary object of this invention to provide new and improved data processing techniques.

It is another object of this invention to provide techniques for processing data wherein the magnetic field associated with one or more interdomain walls is utilized to divide a data storage medium selectively into an ordered arrangement of magnetized areas representative of the data.

It is a further object of this invention to provide techniques for scanning a data storage medium with the magnetic field of an interdomain wall which traverses a closely associated scanning medium.

It is still another object of this invention to obtain a storage device having a high data storage density per unit volume of storage medium.

In applying the techniques which form the subject matter of the present invention, a scanning medium and a data storage medium are positioned in close association with each other. The scanning medium has a predetermined easy direction of magnetization and follows a substantially square hysteresis characteristic in response to a magnetic field applied in this direction. In accordance with the most advanced available theories, the electrons spin axes of the scanning medium are substantially parallel to an axis of preferred alignment in such a situation. The tendency of the electron spin axes is to remain aligned, i.e., to remain parallel to the preferred axis. This is true even though the spin axis orientation, i.e., the relative north and south poles of respective electron spin axes may be opposed. Each distinct domain of the scanning medium consists of an area of like-oriented electron spin axes and is separated from an adjacent, oppositely oriented domain by an interdomain wall which constitutes the transition between oppositely oriented domains. In the present invention, these interdomain walls are established successively in the scanning medium and are made to traverse a given dimension thereof. The concentrated magnetic field associated with one or more of the traversing interdomain walls, hereafter called the scanning field, thus scans the storage medium which is positioned within the effective range of this field. The effectiveness of such a scan may be variously controlled by modulating the scanning velocity, by selectively opposing the scanning field or by a combination of both, to produce static magnetized areas in the storage medium in accordance with the data to be stored.

Data readout proceeds as follows: The storage medium is scanned with the magnetic field associated with the aforesaid traversing interdomain wall of the scanning medium. The existence of static magnetized areas in the storage medium slows down the traversing wall and, hence, these areas are detected by sensing wall velocity changes.

These techniques make possible a data storage density greatly in excess of that heretofore possible, one theoretical upper limit being imposed by the thickness of the interdomain walls. Additionally, the range of the available access time is very large and lends flexibility to the possible applications of these techniques in the solution of different problems.

These and other novel features of the invention together with further objects and advantages thereof will become more apparent from the following detailed specification with reference to the accompanying drawings, in which.

Figure 1:
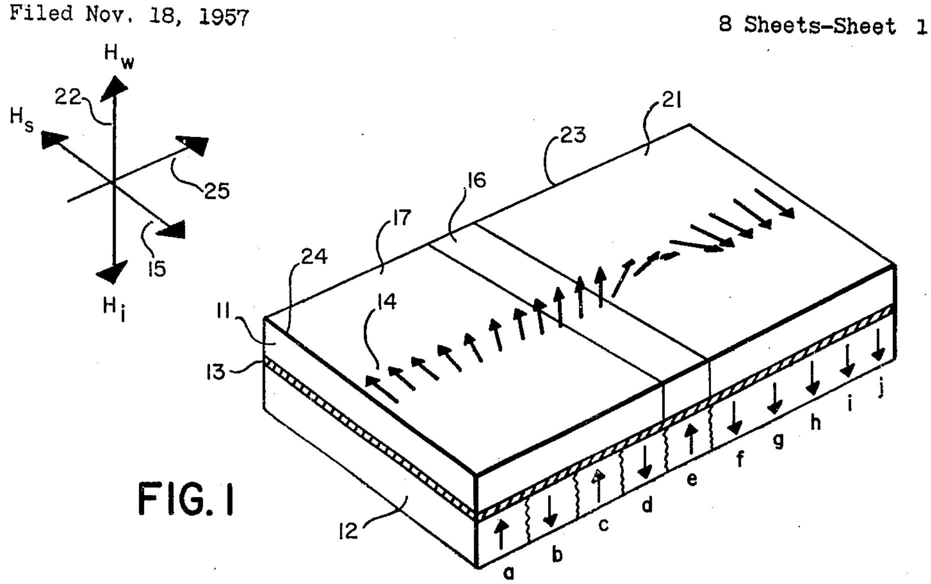
FIG. 1 illustrates one embodiment of the invention which uses controlled wall motion and which demonstrates the underlying principles of the invention.

The description and the use of interdomain walls is probably simplest to explain in the case of a thin film of ferromagnetic material which may be between 100 A. and 10,000 A. in thickness. Thin films of ferromagnetic material, typically Fe, Ni, Co, MnBi or alloys thereof which have been correctly treated to obtain an easy direction of magnetization, i.e., to align the electron spin axes substantially parallel to an axis of preferred alignment, are capable of being magnetized to saturation along the aforesaid easy direction to form a single magnetic domain. Theoretically, in such a domain all the elementary magnets of the film, i.e., all the electron spin axes, are oriented substantially alike. If the magnetizing field is reversed and the field is sufficiently strong, it is possible to reverse the orientation of the entire domain rapidly by domain rotation. In such a case, the elementary magnets reverse their direction by 180° substantially simultaneously. This property of rapid switching, which is of the order of $10^{-9}$ seconds, together with the square B-H characteristic of oriented thin films, is of particular importance in the application of these films to magnetic cores and core matrices, both well known in the prior art. See Journal of Applied Physics 26, p. 975, 1955.

If the reversing field is of an intermediate strength, i.e., somewhat larger than the coercive force $H_c$ which is required to reverse the magnetization, the domain reversal proceeds more slowly by the mechanism of wall motion. In the latter process, reversal of the elementary electron spin moments of the film begins at one or more nuclei and spreads over the area of the film. During this process the film consists of domains which are saturated to magnetization in opposite directions, the domain boundaries comprising the aforementioned interdomain walls or Bloch walls as they are commonly referred to. Provided the aligned electron spin axes were initially in the plane of the film, they are caused to rotate out of this plane in the region of the interdomain wall field. Thus, centrally of the finite wall thickness the spin axes are perpendicular to the plane of the film, while on either side they conform to the mutually opposite orientation of respective bordering domains. Accordingly, intermediate the two sides of the wall the electron spin axes assume every transitional position required to execute a 180° reversal. In certain typical ferromagnetic materials of the kind referred to above, this transition occurs over a distance of about 100 lattice cells which is typically of the order of 1000 A. Interdomain walls can be formed at one edge of the thin film and can be made to progress across the film in a controlled fashion. They have been observed in a number of ways including the method of Bitter (H. J. Williams and R. C. Sherwood, Magnetic Domain Patterns on Thin Films, Jour. Appl. Physics 28, 548, 1957) in which a colloidal suspension of magnetic particles on the surface of the film results in the agglomeration of these particles in the strong normal field associated with the wall. Another method has employed the well known magneto-optic effect, as described in Phys. Rev., vol. 100, p. 746, 1955.

The application of moving interdomain walls as a scanning probe depends on the ability to form and propagate a single wall or a spatially restricted concentration of walls in a controlled way across a film of material. The Bloch wall qualifies for this application by nature of its small spatial extension in the direction of motion, by the absence of dispersion in the course of its motion, by its controllable velocity of motion, and by its high volume efficiency since no magnetic head is required. Other practical advantages include the ability to use the concentrated external magnetic field of the wall itself for both reading and writing operations, the static, non-volatile, non-destructively readable and erasable potentialities and finally the low cost of preparation.

With reference now to the drawings and particularly FIG. 1 thereof, one embodiment of the present invention is illustrated. A thin-film scanning medium 11 is separated from a thin-film storage medium 12 by a film of insulation 13. A substrate, e.g., glass, which forms a rigid base for the media is omitted from this drawing for the sake of clarity. If atomic diffusion can be avoided when there is direct contact between the two media the insulation film may be omitted. When the latter is used, it consists of a non-magnetic, non-conductive material whose thickness is small enough to permit the positioning of the storage medium within the effective range of the magnetic scanning field which is associated with the traversing interdomain walls of the scanning medium. Accordingly, the dimensions shown in FIG. 1 are not intended to be representative of the true dimensions, the thickness of the insulation film being approximately of the same order as that of the media. A material which may be used for the insulation film is SiO, since it can be applied in a special manner discussed hereinbelow. The media consist typically of one of the aforementioned metals Fe, Ni, Co, MnBi or alloys of these, such that the switching or reversal time of the storage medium, i.e., the time required to reorient one electron spin axis by 180° as described above, is large compared to that of the scanning medium. The material of the storage medium permits it to support many long, narrow, closely spaced, static domains and hence its coercive force $H_c$ is relatively high. Predetermined non-uniformities as well as impurities may also be provided in the storage medium in order to retain the aforesaid static domains. The easy direction of magnetization of the scanning medium is indicated by electron spin axes 14 which are shown to be substantially parallel to a preferred axis of alignment 15, the latter being illustrated in the vector diagram which forms part of FIG. 1. An interdomain wall 16 divides the scanning medium into two separate domains 17 and 21, having substantially oppositely oriented electron spin axes. The electron spin axis orientation of the transitional area which comprises the aforesaid interdomain wall 16, is seen to be substantially at right angles to the plane of scanning medium 11, such that the field vector $H_W$ of the magnetic scanning field is parallel to axis 22. A switching field $H_S$ which has a time-varying magnitude is applied in the direction shown and may have a uniform field gradient along a given dimension of the scanning medium. In the embodiment of FIG. 1 this dimension is defined by edge 23. As a result, an interdomain wall is established at edge 24 which traverses the storage medium along the given dimension in the direction of vector 25 while the associated scanning field scans a corresponding dimension of the storage medium.

Figure 2:
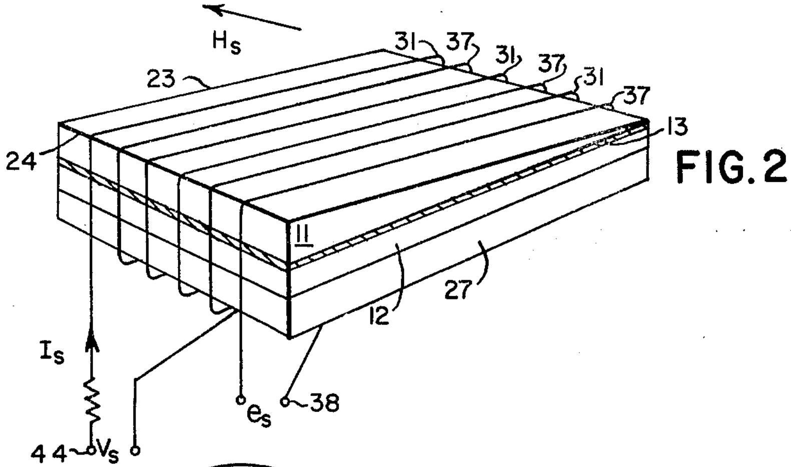
FIG. 2 illustrates means for applying a switching field to the apparatus of FIG. 1.

In lieu of applying a gradient switching field, a time-varying field which is uniform along the dimension defined by edge 23 may be applied while scanning medium 11 has a uniformly tapering thickness along this dimension as shown in FIG. 2. If the thickest portion of the scanning medium is at edge 24, the effect of the switching field is strongest at this edge and the interdomain wall is established there. The electron spin axes of the storage medium shown in the embodiment of FIG. 1 are substantially parallel to an axis of preferred alignment 22 which indicates the easy direction of magnetization. Since the scanning field $H_W$ is parallel to this axis, it is capable of reorienting the electron spin axes of a narrow region of the storage medium in accordance with its own vector direction. In the case illustrated in FIG. 1, the latter direction is at right angles to the plane of the storage medium and upward.

The method of storing data in the apparatus of FIG. 1 consists essentially of dividing the storage medium into static domains separated by static interdomain walls, where each domain is representative of a portion of the data to be stored. This is carried out by selectively applying the $H_S$ field to establish an interdomain wall at edge 24 of the scanning medium, and causing the wall to traverse the aforesaid given dimension of the medium. The effect of the scanning field is to reverse the orientation of the electron spin axes of the storage medium, i.e., to bring about progressively the uniform perpendicular magnetization of the latter as the scanning field scans a corresponding dimension of the storage medium. Data is written by applying an inhibiting field $H_i$ which opposes the scanning field such that the resultant field $H_W - H_i$ is too small to exceed the coercive force of the square loop storage medium. The application of $H_i$ signals occurs in a time sequence in accordance with the data to be stored, each such application causing an area of the storage medium to retain its orientation. Each of these areas depends in extent upon the distance the interdomain wall traveled during the time interval when the inhibiting field was applied. Thus, if it be assumed that the initial electron spin axis orientation throughout the entire storage medium was as shown in positions *f* through *j*, i.e., opposite to the direction of the $H_w$ field, it will be seen that the action of $H_w$ to reorient these spin axes was inhibited in positions *b* and *d*, while reorientation took place in positions *a*, *c* and *e*. Thus, the scanning action to the extent illustrated in FIG. 1, produced five static oppositely oriented domains separated by static interdomain walls, while the positions defined by letters *f* through *j*, as yet unscanned and all oriented in the same direction, still constitute a single domain. It will be evident that data significance may be assigned to each domain so created. For example, the orientation of each domain may be representative of a binary ONE or a binary ZERO. In this connection it should be noted that, where the effect of the scan is the same in two or more successive positions, the resultant area actually forms a single domain. By means of a self-clocked readout, e.g., of the kind described in a copending application to Harrison W. Fuller et al., Serial No. 505,894, filed May 4, 1955, now Patent No. 2,972,235, it is possible to determine the existence of adjacent like-oriented areas. The self-clocked readout is described below with reference to FIGS. 17 and 18.

The energy obtained upon data readout from a single domain may be too small to produce a usable signal-to-noise ratio. A sequence of oppositely oriented domains may be used for each bit cell, where the particular order of the domains is representative of the binary digit. It should be noted that self-clocked readout is also applicable here.

The latter readout method is dependent upon spatially stabilized bit cells. To provide this condition the double pulse RZ (return to zero) method of recording may be used, as described in the above cited copending application. For example, an unreversed region may precede a reversed region of magnetization to represent a binary ZERO, while following the reversed region for a binary ONE. Such sequences are again recorded by the selective use of the inhibiting field.

In general, once the entire scanning medium assumes the spin axis orientation of domain 17, a new wall can be produced only by reorienting the spin axes in the direction presently assumed by domain 21. In order to bring this about the direction of the switching field $H_s$ must be reversed. The occurrence of an erasing scan always calls for a scanning field which is reversed in direction from that of the previously occurring recording scan. Similarly, every recording scan must have a scanning field of opposite direction to that of the last occurring erasing scan. Since the direction of spin axis rotation determines the direction of the $H_w$ vector of the traversing interdomain wall, it is important under these conditions that successive spin axis rotations of the scanning medium occur in the same direction. Thus, unless the counterclockwise rotation of the electron spin axes, indicated as occurring between domains 17 and 21, is continued, the next-occurring interdomain wall, which will reorient domain 17 to the spin axis orientation of domain 21, will have an $H_W$ vector in the same direction as the one shown in connection with wall 16 of FIG. 1. Such a wall could not erase, i.e., reorient the electron spin axes of the storage medium to bring about the initial orientation as shown at positions *f* through *j*. For this reason a small quadrature field which is parallel to axis 22 is employed to assure successive spin axis rotations in the same direction. In the case of FIG. 1, the quadrature field is applied at edge 24, in the same direction as $H_i$. Partial erasing, i.e., reversing the uniform perpendicular magnetization of only a portion of the storage medium may be achieved by applying an erasing scan and opposing its scanning field during a portion of its travel by the application of an inhibiting field.

The data readout operation is carried out by scanning the storage medium while an oppositely directed inhibiting field is maintained in order to prevent any erasing from taking place. The resultant field which then scans the storage medium produces voltage variations in an appropriate sensing winding upon being velocity modulated by the magnetic fields associated with the static interdomain walls of the storage medium. These voltage variations are detected and are indicative of the presence of respective domains and, hence, of the stored data. In an alternative readout method, no inhibiting field is used and the applied switching field causes the wall to propagate at a rate too large to affect the magnetized areas. As above, the irregular velocity pattern of the traversing wall, which is due to the existence of the local fields of the information bearing domains of the scanning medium, is observed by the voltage variations in the sensing winding.

The above methods of detecting oppositely oriented domains can be compared to the well known Barkhausen effect which occurs naturally in ferromagnetic materials. The imperfections which cause velocity modulation of the moving interdomain walls in this case are represented above by the fields of the data-bearing domains of the storage medium.

FIG. 2 illustrates one embodiment for implementing the operation discussed above in connection with the "sandwich"-type apparatus shown in FIG. 1, applicable reference numerals having been carried forward. A substrate 27, which may be glass, is located under storage medium 12 and lends support to the entire structure. A source $V_s$ applies a slowly increasing voltage to send an increasing current $I_s$ through field coil 31 which is wound about the sandwich. Due to the graded thickness of the scanning medium, the effect of the resultant switching field $H_s$ is to produce an interdomain wall at the thickest portion of the scanning medium. The increasing switching field then moves the wall by overcoming the coercive force of the progressively thinner sections of the scanning medium. Sensing winding 37 is wound around the sandwich parallel to field coil 31 and has terminals 38 conveniently located to measure a voltage $e_s$ during readout, which is indicative of the presence of distinct domains, as described above.

Figure 3:
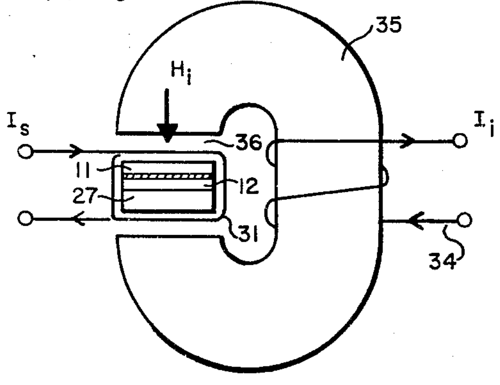
FIG. 3 illustrates means for applying an inhibiting field to the apparatus of FIG. 2.

FIG. 3 illustrates an embodiment for applying the inhibiting field $H_i$. A current $I_i$ is applied to a field coil 34 which is wound around a core 35. The latter has an air gap 36 large enough to contain the "sandwich." The field $H_i$ which exists in the air gap is applied to the entire scanning medium and is at right angles to the plane of the sandwich. The direction of current $I_i$ determines the proper field direction in opposition to $H_W$.

Figure 4:
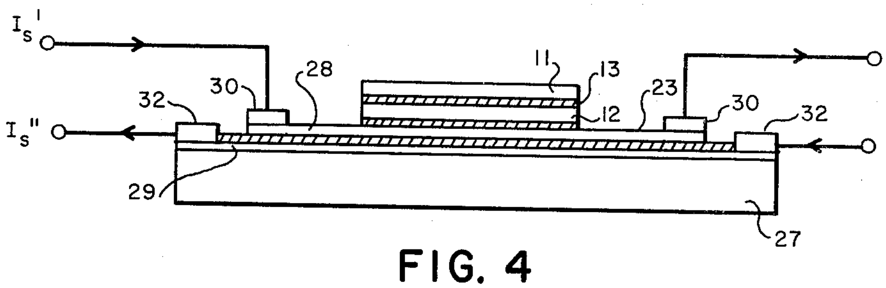
FIG. 4 illustrates a preferred embodiment for applying a switching field to the apparatus of FIG. 1.
Figure 5:
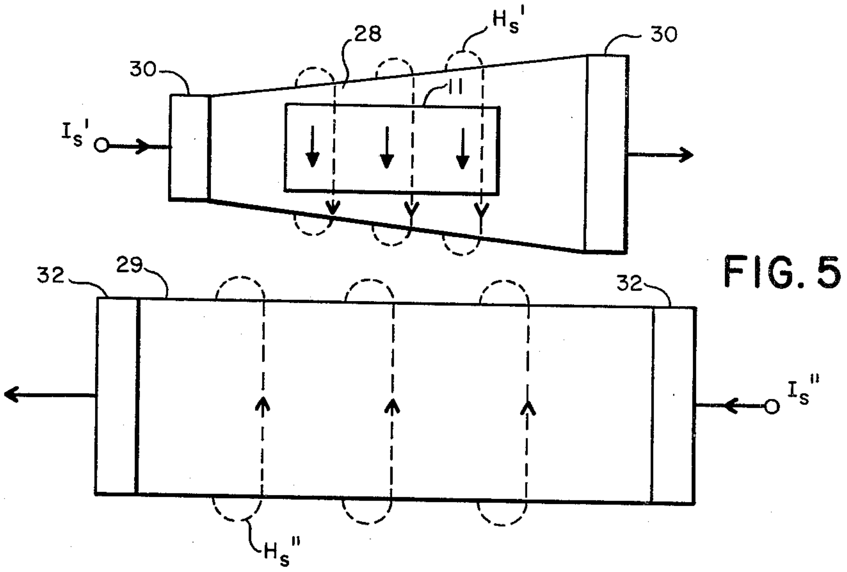
FIG. 5 is a detail view of FIG. 4.
Figure 6:
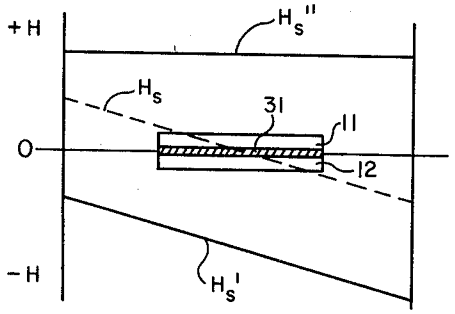
FIG. 6 illustrates in schematic form the component switching fields applied to the apparatus of FIG. 4.

A preferred way of obtaining a switching field gradient is illustrated in FIGS. 4, 5 and 6, applicable reference numerals again being retained. Substrate 27 supports two conductive, non-magnetic films 28 and 29 which may consist of silver and which are separated from each other by a film of insulation. Another insulation film separates the ferromagnetic film of storage medium 12 from conductive film 28. The latter in turn is succeeded by insulation film 13 and by the ferromagnetic film of scanning medium 11. As may best be seen from FIG 5, a current $I_s''$ is applied from a conductor to a thick block 32 which serves the function of presenting a uniform distribution of current to conductive film 29. The current flow creates a magnetic field $H_s''$ which surrounds the plane of film 29. The field is uniform close to the film surface and is normal to the direction of current flow. As will be apparent from FIG. 6, the $H_s''$ field is also uniform along the path of current flow in the film. Since the scanning medium is positioned within the effective range of this field, a uniform $H_s''$ field is applied along the dimension of wall traversal. In a preferred embodiment film 29 overlaps every edge of the "sandwich" in order to prevent end effects due to its magnetic field. Where the latter are sufficiently small, all the films of the embodiment of FIG. 4 may cover the same area. A current $I_s'$ is applied to block 30 which presents a uniform current distribution to film 28. The latter is tapered in width and similarly overlaps every edge of the "sandwich." The field $H_s'$ which is due to the $I_s'$ current, differs from the $H_s''$ field by being of opposite direction in the vicinity of the scanning medium and having a field gradient along the dimension of wall traversal. The resultant switching field $H_s$ which is applied to the scanning medium, creates a region 31 intermediate strong positive and negative fields where the magnetic field strength is less than the coercive force of the medium. It has been determined that such a region reqiures the existence of an interdomain wall and hence, passing region 31 across the scanning medium will determine the origin as well as the traversal of the wall. By increasing the magnitude of $I_s''$ in time, the resultant $H_s$ will vary such that the aforesaid region traverses the scanning medium and thereby controls the motion of the interdomain wall. It will be evident that numerous structural variations are possible for obtaining the same result. For example, positioning the "sandwich" intermediate two conductive films, which are connected together along one edge, permits the use of a single current source. Still further refinements are possible by using a third conductive film.

Regardless of the number of conductive films used for each "sandwich," or their position relative to the "sandwich," successive "sandwiches" with their associated conductive and insulation films can be built up by using a single substrate as a base, current connections to respective conductive films being made along the edges.

In the case of the embodiment illustrated in FIG. 4, a vacuum evaporation process may be used to deposit every one of the films. Thus, a non-magnetic, conductive film 29 is vacuum-deposited on substrate 27 such that its width is uniform. This is followed by an insulation film, e.g., SiO, which separates the subsequently deposited non-magnetic, conductive film 28 from film 29. Film 28 is applied so as to taper in width, as shown in FIG. 5. Another insulation film is applied and insulates the subsequently deposited film of the storage medium, from conductive film 28. As previously explained, the storage medium consists of a high coercive force, ferromagnetic material which exhibits a substantially square hysteresis curve upon the application of a field in the easy direction of magnetization. It is deposited under the influence of a strong magnetic field whose direction determines the aforesaid easy direction of magnetization of the medium. In order to obtain the storage medius spin axis alignment illustrated in FIG. 1, the applied magnetic field must be normal to the plane of the substrate during the vacuum deposition of this film. An insulation film 13 is deposited on the storage medium and is followed by the scanning medium. The latter consists of another ferromagnetic film exhibiting a square loop behavior in the easy direction of magnetization. It is deposited under the influence of a magnetic field which is parallel to the plane of the substrate and the easy direction of magnetization of the scanning medium is determined accordingly. In the event that a storage medium of graded thickness is desired, a rotating intercepting mask or shield is interposed between the source of the metal and the area on which it is to be deposited. By continuously varying the speed of rotation of the mask, or by shaping its contour, the evaporating metal is intercepted in a manner which achieves the desired effect at the target. Masking is also used to determine the outline of all the films deposited, including the variable width film 28 of FIG. 5. Where block 30 and 32 are not used, masking may also determine the connection to the current conductors of the conductive films.

Except in the case where the scanning medium is to be graded, all films are applied with a uniform thickness. Depending on the requirements of each case, the latter may vary from 100 A. to 10,000 A. Blocks 30 and 32 are conductively affixed to respective conductive films after the deposition process is completed and conductive leads are then attached to the blocks. It should be noted that the area of the conductive films should exceed that of the "sandwich" in order to eliminate the edge effects of the magnetic fields, but the exact amount of overlap is unimportant. The area of the sandwich itself will depend on the particular situation, but may be limited by the dimension which the interdomain wall can traverse reliably. Thus, an excessive tendency of the wall to curve during its traversal of the scanning medium may be undesirable when it impairs the reliability of the scan. Such curvature is sometimes aggravated by an excessively long traversal and, hence, there may be a limitation on the area of the scanning medium. It should be noted, however, that wall curvature is not damaging as such, provided it is reproducible on successive scans.

One method of inhibiting the curvature of the interdomain walls is to provide straight line discontinuities in the storage medium normal to the direction of travel of the scanning field. These may, for example, take the form of grooves at intervals equivalent to the expected storage density, which may be produced during the vacuum deposition process. Alternatively, deposition of the storage medium can be performed on a diffraction grating replica. Final polishing of the high spots produces true discontinuities, and the uniform insulation as well as the scanning medium are deposited thereon. The advanced sections of the curved traversing wall will then be delayed sufficiently at each discontinuity to enable the lagging section to catch up. Since the average wall velocity may be properly controlled, these regularly spaced discontinuities produce periodic variations in the applied switching voltage. These variations may be sensed during the data writing process to furnish an external clock.

In order to obtain reliable data readout, it is important that the storage medium retain its static interdomain walls in the same position where they were formed during the data storage process. The use of a high coercive force material for the storage medium may not alone be sufficiently reliable to accomplish this in the presence of external fields. To this end, finely divided impurities may be deposited together with the material of the storage medium, which will aid in trapping the walls to keep them stationary. Alternatively, the storage medium may be applied through a finely divided screen which creates minute discontinuities between metallized spots.

It will be remembered, on the other hand, that freely movable walls are desired in the scanning medium and hence a low coercive force material is used. Care must be taken to shield the scanning medium from the effects of external fields, including the earth's magnetic field.

In the above-described data processing technique, velocity modulation of the traversing interdomain wall may be substituted for the use of the inhibiting field in order to control the effectiveness of the scanning field during storage as well as during readout. In this method, the interdomain wall normally traverses the scanning medium at a velocity too great for the associated magnetic scanning field $H_W$ to have any effect on the storage medium. Data is written at the desired positions of the storage medium by decreasing the velocity of motion of the interdomain wall. This permits the $H_W$ field to reorient the effected area of the storage medium. Taking the embodiment of FIGS. 5 and 6 as an example, a binary ONE is written by opposing the time-varying switching current $I_s''$ such that its rate of increase is temporarily slowed down. As a result, region 31 travels across the scanning medium at a lower velocity and causes the scanning field to linger long enough to reverse the perpendicular magnetization of the storage medium. Thereafter, the original velocity of the wall is resumed. In the case described, binary ZEROS are represented by the non-reversal of the perpendicular magnetization of the storage medium. In order for this method to be successful, the scanning medium should have a small reversal time relative to that of the storage medium.

Figure 7:
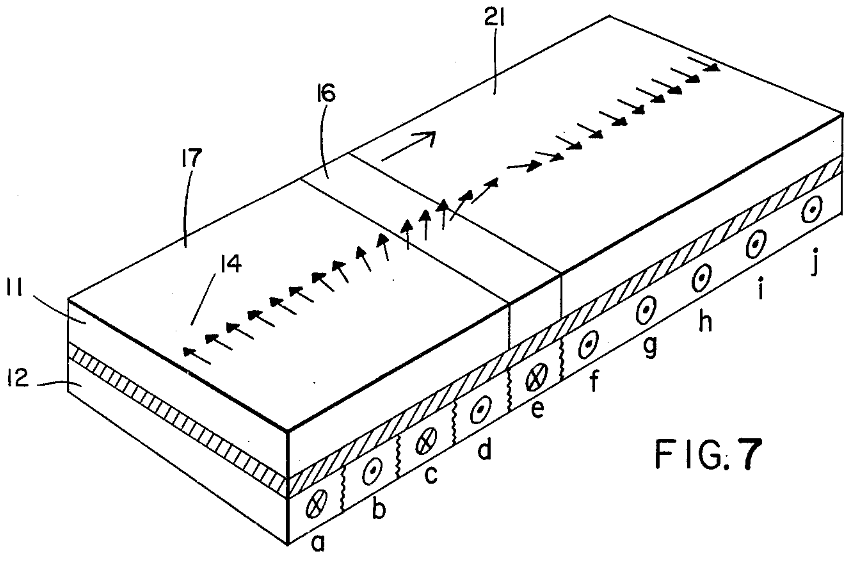
FIG. 7 illustrates an embodiment of the invention wherein the easy direction of magnetization of both media is the same.

In the embodiment of FIG. 1 a certain measure of independence is maintained since the preferred axes of alignment of the two media are normal to each other. Another embodiment of the invention is illustrated in FIG. 7 where storage medium 12 is seen to have an axis of preferred alignment which is identical to that of scanning medium 11. In this embodiment, the motion of the electron spin axes 14, as they are reoriented by the traversing interdomain wall 16, is relied on to reorient the electron spin axes of the storage medium. An inhibiting field may be used to control the effect of scan, or, alternatively, velocity modulation of the wall motion may be employed. In the latter case, the required reversal time of the scanning medium should be considerably lower than that of the storage medium. As in the case of FIG. 1, FIG. 7 shows positions *a* through *j*, data having been stored at positions *a* through *e*. A circle with a dot indicates the head of an arrow, i.e., a spin axis orientation equivalent to that of domain 21, while a cross indicates an orientation equivalent to that of domain 17.

For writing information in the embodiment of FIG. 7 the scanning wall field $H_W$ causes spins of the storage film to rotate up out of the plane and approach the direction of $H_W$ (FIG. 1) in the region of the scanning wall. In the absence of the application of an additional field for writing information these spins would fall back to their initial direction along the easy axis as the scanning wall passes on, but if a writing field is applied along the $H_s$ direction (of FIG. 1) the spins will fall back into the plane of the film to be antiparallel to their initial direction as the scanning wall passes on.

The techniques hereinabove discussed are not confined to the processing of digital data. If it is desired to store data corresponding to an analog quantity, the representative analog signal may be readily transformed by the well known expedient of pulse width modulation into a signal capable of being used by the apparatus described above. In the embodiment of FIG. 3, the pulse width modulated signal which is representative of the analog quantity is applied to inhibiting winding 34. Where velocity modulation is employed, as illustrated in FIG. 5, the signal is used to modulate current $I_s''$. In either case, the resultant static domains of the storage medium vary in width, such variation being representative of variations in the magnitude of the analog quantity. Data readout is readily carried out by the velocity modulation scanning method described above, whereby the width of the aforesaid domains is detected.

Figure 8:
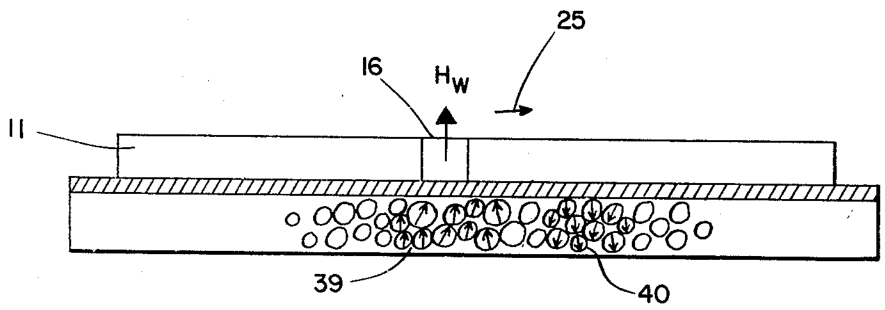
FIG. 8 illustrates an embodiment of the invention which utilizes a multi-domain storage medium.

In an alternative method of processing analog data, a multidomain storage medium is substituted for storage medium 12 of FIG. 1, respective domains of said multidomain storage medium having diverse electron spin axis orientations. See FIG. 8. Non-square loop material is employed for the storage medium which may or may not have a multi-crystalline structure. Utilizing the thin-film scanning medium 11, the scan of field $H_W$ due to traversing wall 16, when either velocity modulated or selectively inhibited, will establish areas in the storage medium which have varying effective strengths of magnetization in accordance with the analog quantity which is to be stored. It will be noted that respective domains of the storage medium, which are indicated by circles and an orientation vector, are not completely aligned in area 39 which is under the influence of the $H_W$ field. In the instant case this is immaterial, since it is the effective strength of magnetization of the area which is representative of the amplitude of the stored analog signal. As in the case of the above described embodiments, a storage scan must be preceded by an erasing scan. Area 40, which has not yet been scanned by the writing wall traversing in direction 25, shows the magnetization due to a previously traversing erasing wall. Readout proceeds in the manner described above, the variation of field strength encountered by the scan being detected as a varying signal representative of the analog quantity. Thus, by utilizing the techniques described herein, data storage of an analog quantity is possible at a density far in excess of that possible with conventional apparatus.

The storage medium need not remain stationary in the region of switching field application. For example, if the storage medium consists of magnetic tape either of the multi-domain variety or tape carrying a thin film having an easy direction of magnetization throughout, data storage may take place in a limited area governed by the extent of the scan. Inasmuch as the tape moves progressively through the region of switching field application, the interdomain wall formed in the scanning medium continuously scans the moving tape. It should be noted that in a preferred embodiment the moving tape carries the storage medium together with the scanning medium past the magnetic switching field. An alternative embodiment is possible wherein the scanning medium is stationary.

Figure 9:
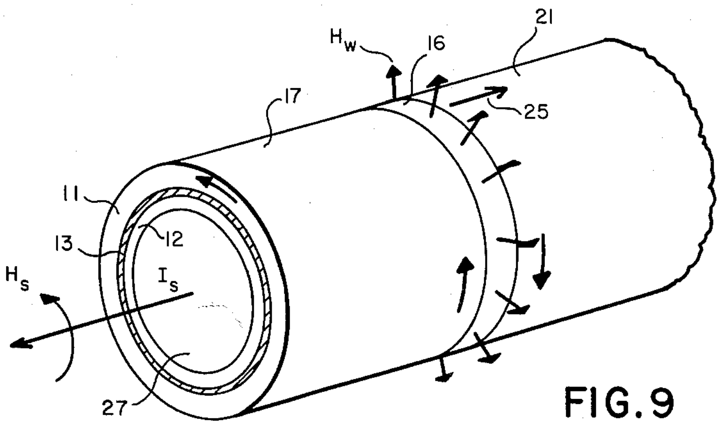
FIG. 9 shows another embodiment of the invention wherein a tubular form is employed.
Figures 10, 11:
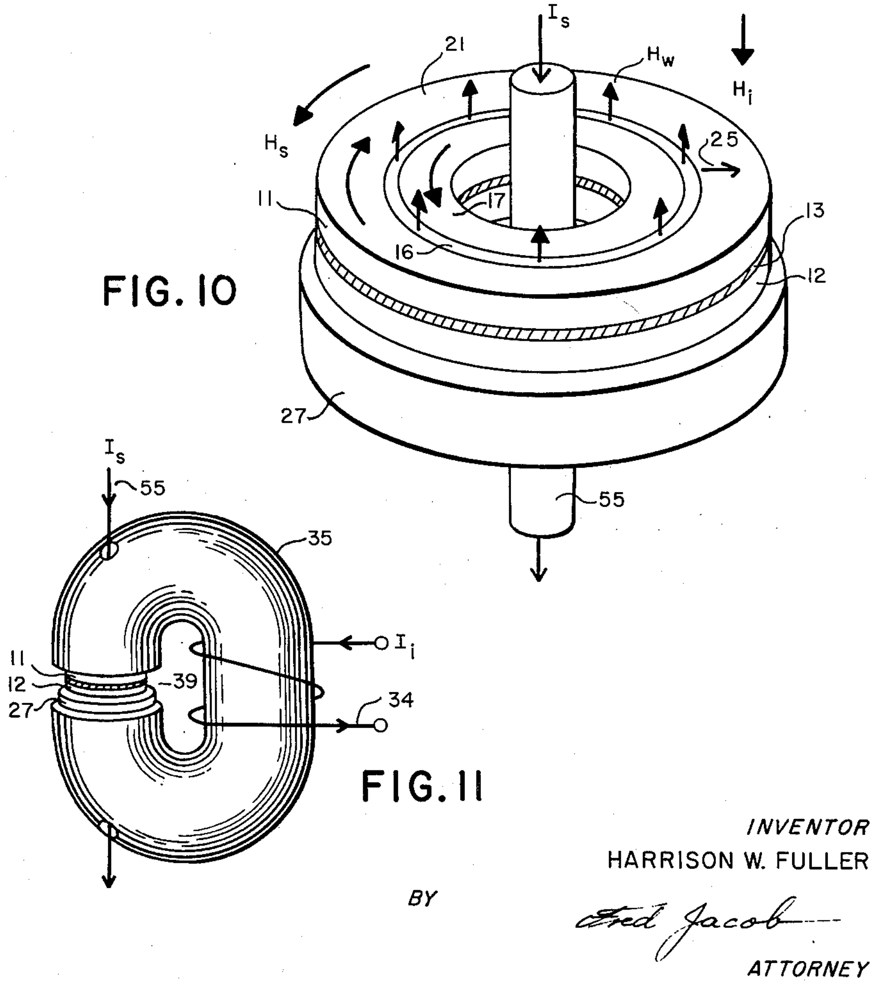
FIG. 10 illustrates an embodiment of the invention in the form of an annular disk.
FIG. 11 shows means for applying an inhibiting field to the apparatus of FIG. 11.

FIG. 9 illustrates another embodiment of the invention which utilizes a cylindrical geometry, corresponding reference numerals having been carried over wherever applicable. A cylindrical substrate 27 carries storage medium 12, which is separated by a film of insulation 13 from scanning medium 11. As in the example discussed above, the films may be vacuum-deposited. Furthermore, the relative positions of the two media may be reversed. An axially disposed conductor carries switching current $I_s$ and produces a counter-clockwise switching field $H_s$, as shown. In the event that the conductor itself constitutes the substrate, a further film of insulation is required intermediate the conductor and the storage medium. A field gradient along the axis of the tube may be established by means of a tapering thickness of the scanning medium. Alternatively, the field gradient may be established by means of a tapering conductor. The easy direction of magnetization of the scanning medium is circular and in the cylindrical surface of the tube. The easy direction of magnetization of the storage medium is normal to the surface of the medium, i.e., radial with respect to the tube axis. The application of a time-varying switching field $H_s$ produces circular interdomain wall 16 and causes it to traverse the length of the tube in the direction indicated by arrow 25. In so doing it reverses the spin axis orientation of the scanning medium as indicated in FIG. 10 by the oppositely oriented domains 17 and 21. The concentrated magnetic scanning field $H_W$ associated with the wall has a radial direction relative to the tube axis and hence it can operate on the radially aligned electron spin axes of the storage medium. Either an inhibiting field or velocity modulation of the wall may be employed in order to control the effectiveness of the scan. The tubular configuration eliminates end effects due to the magnetic field, as well as those due to the termination of an interdomain wall at the edges of a scanning film wherein the wall does not close on itself. Accordingly, no special precautions, such as in the case of the embodiment illustrated in FIG. 4, need be taken here.

FIG. 10 illustrates another embodiment of the invention which is not subject to end effects. Both scanning medium 11 and storage medium 12 have the shape of annular rings with a film of insulation 13 disposed therebetween. A substrate 27 forms the base and conductor 55 is disposed normal to the plane of the annular rings and at the center thereof. Switching current $I_s$ in the conductor creates a circular switching field $H_s$, which has a field gradient radial of the ring. The easy direction of magnetization of the scanning medium is seen to be parallel to its two circular edges while that of the storage medium is in a direction perpendicular to the plane of the storage medium. The application of a switching field establishes an interdomain wall at the inner edge of the scanning medium and causes the latter to move outward in a radial direction as indicated by arrow 25. Provided the scanning medium is initially oriented in the clockwise direction, as indicated in domain 21, the traversal of the interdomain wall reorients the medium as shown by domain 17.

Writing on the storage medium may again be effected by means of velocity modulation of the wall, i.e., by controlling $I_s$, or by the use of an inhibiting field $H_i$. Apparatus for applying the inhibiting field is illustrated in FIG. 11. Inhibiting current $I_i$ is applied to a coil 34 which is wound on core 35. An air gap 39 in the core contains the annular substrate which carries the two media. Conductor 55 which is disposed centrally of the disk extends through a hole drilled into the core. The application of the inhibiting field opposes the scanning field $H_w$ at chosen intervals, thereby permitting $H_w$ to magnetize selected areas of the storage medium in accordance with the data to be stored therein.

It is a property of thin-film media that variations in the uniformity of the film such as thin spots, scratches or impurities can serve as nuclei for the origin of random interdomain walls upon the application of a switching field. These non-uniformities may cause variations in the local direction of uniaxial anisotropy, i.e., variations in the local easy direction of magnetization. For example, local stresses in the scanning medium may cause the local magnetostrictive anisotropy to overcome that induced by the orienting field with the result that the interdomain wall in the affected areas, as compared to the remainder of the medium, will not be parallel to the easy direction of magnetization. This property is taken advantage of in the embodiment of the invention illustrated in FIGS. 12, 13 and 14. In this embodiment it is not important where in the scanning medium the nucleus of such a random interdomain wall is located nor, indeed, how many nuclei exist. It is only important that the walls be capable of being faithfully reproduced upon the application of a switching field. The domain wall motion, which is a function of the random field gradient which exists, need not proceed from a given point nucleus in a generally outward direction, but may also occur in a manner where the area surrounded by the domain wall decreases. Indeed, it is possible that within the area defined by a decreasing domain wall a nucleus exists which gives rise to a domain wall that moves in a direction generally outward from the last recited nucleus so as to meet the domain wall of the aforesaid decreasing area. In such a case the domain walls disappear to form a single domain. Similarly, two outwardly moving domain walls may meet and disappear. As previously pointed out, in order to utilize the phenomenon of random wall motion upon the application of a magnetic switching field, it is important that these walls be made to occur in a reproducible manner. In the embodiment illustrated in FIG. 12, scanning medium 11 has an easy direction of magnetization in the plane of the medium and further contains an interdomain wall 16 which is assumed to be moving in a generally outwardly direction from a nucleus located somewhere within domain 21. With the exception of scanning film 11 which contains non-uniformities, the construction of this embodiment follows closely that of the "sandwich" illustrated in FIGS. 1, 2 and 3. The substrate has been omitted from FIG. 12 for the sake of clarity. The drawing illustrates the case where the original spin axis orientation 61, as indicated by domain 17, has been reversed by outwardly moving wall 16 to the orientation 62 of domain 21. The application of inhibiting field $H_i$ modulates the effect of scanning field $H_w$ upon storage medium 12, the latter having an easy direction of magnetization perpendicular to the plane of the medium.

Figure 12:
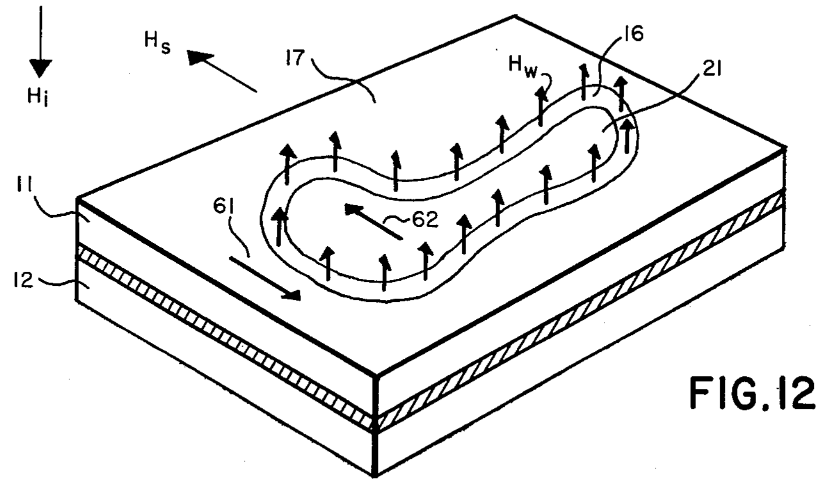
FIG. 12 illustrates another embodiment of the invention using random wall movement.
Figure 13:
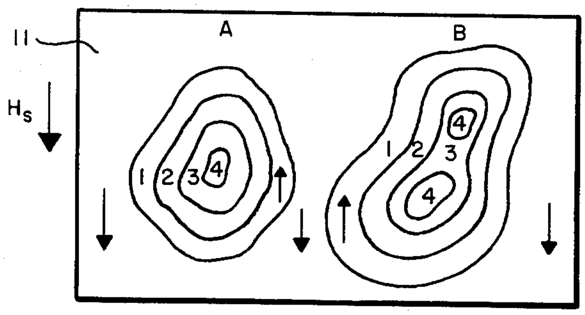
FIG. 13 shows the scanning medium of FIG. 12 during four successive stages.

FIG. 13 illustrates four successive stages in the motion of random interdomain walls which occur at two general locations A and B of the scanning medium of FIG. 12. The application of switching field $H_s$ causes a wall to originate at a nucleus located somewhere outside of area 1 at locations A and B respectively, and to shrink in a generally radial direction. It will be seen that area 3 at location B splits into two separate areas during stage 4. The spin axis orientation of the areas encircled by the interdomain walls, relative to that of the remainder of the scanning medium, is indicated by the direction of the arrows.

Figure 14:
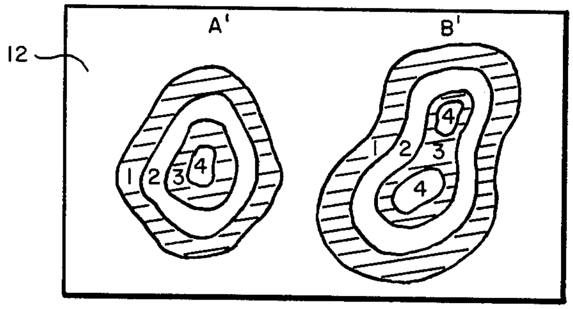
FIG. 14 shows the storage medium of FIG. 12 after data has been recorded.

FIG. 14 shows the effect which may be achieved at locations A′ and B′ respectively, of storage medium 12 by utilizing the above-described random interdomain wall motion in cooperation with an inhibiting field. The selective application of the inhibiting field $H_i$ during the second and the fourth stage produces oppositely oriented domains 1, 2, 3 and 4 respectively at each of locations A′ and B′, where domains 2 and 4 retain their original spin axis orientation. If, in the manner explained hereinabove, binary digital significance is assigned to the orientation of distinct bordering domains, it will be seen that alternate binary ONES and ZEROS are stored at the two locations of the storage medium.

Figure 15:
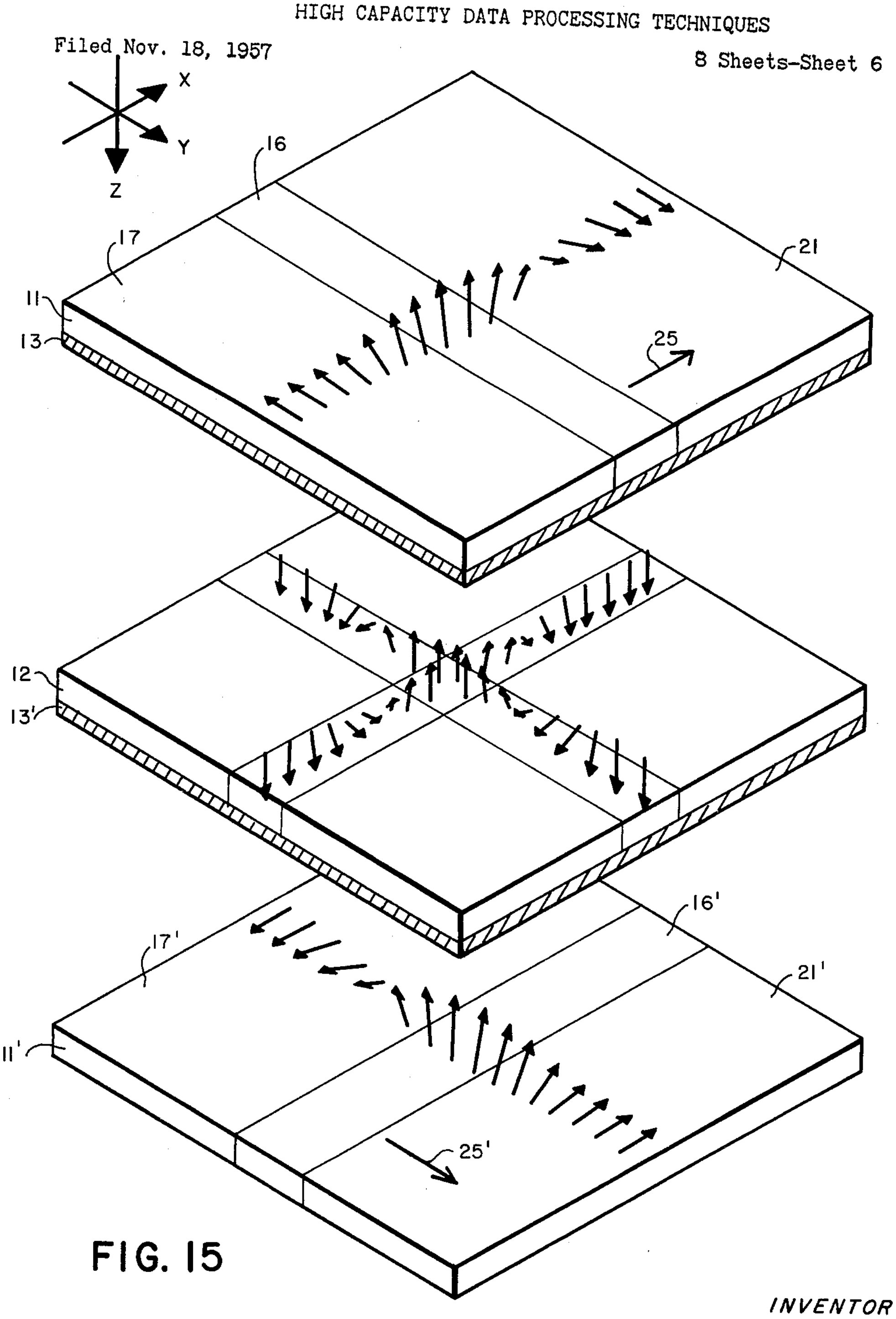
FIG. 15 illustrates a matrix-type storage apparatus.
Figure 16:
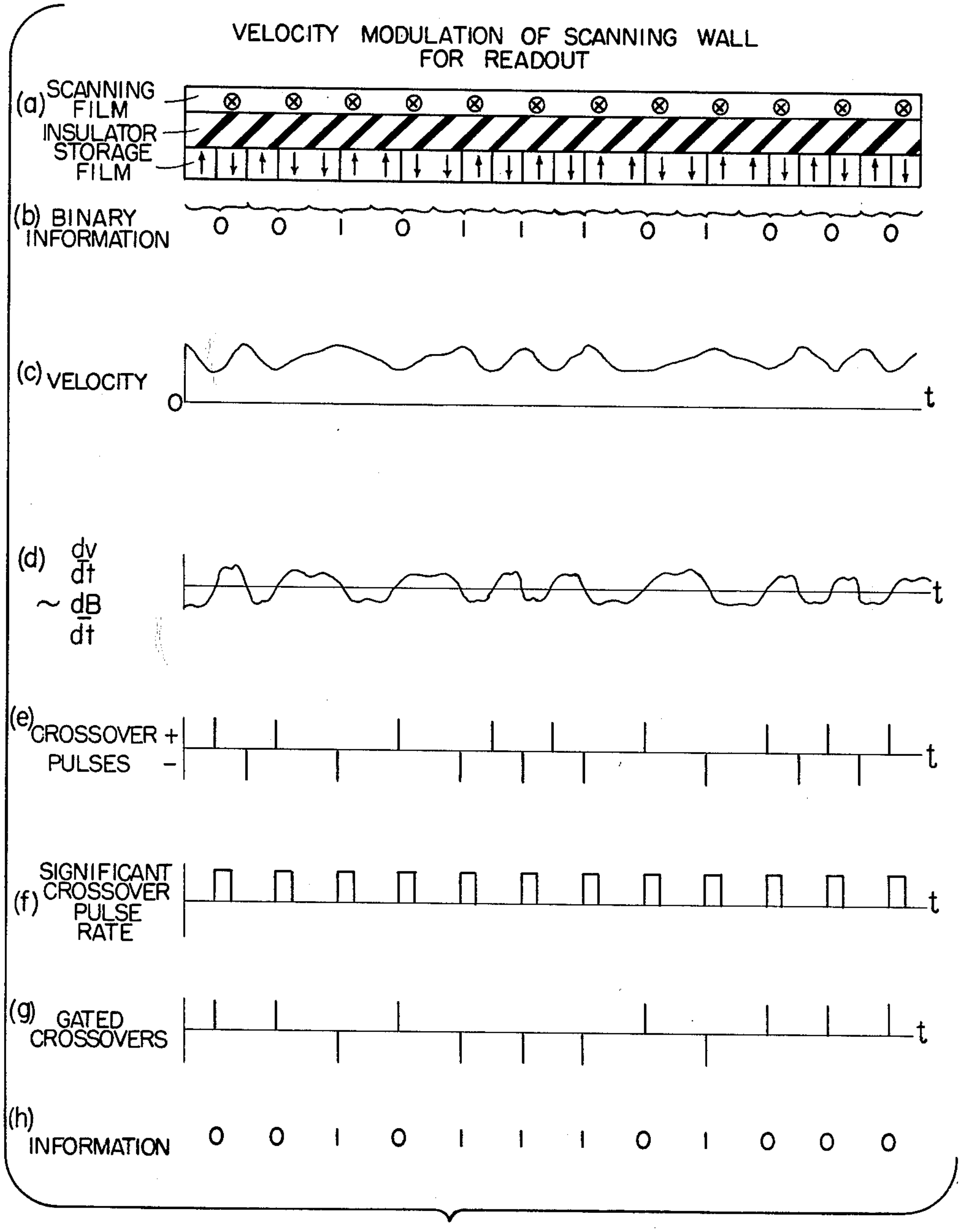
FIG. 16 is a graphical presentation of waveforms plotted to a common time scale, pertinent to an understanding of its operation.

FIG. 15 shows an exploded view of an embodiment of the present invention which relates to scanning matrix storage devices. A storage medium 12 is interposed between scanning media 11 and 11′ respectively, insulation films 13 and 13′ separating respective media from each other. The easy direction of magnetization of scanning medium 11 is parallel to the Y-axis, while that of scanning medium 11′ is parallel to the X-axis. The application of a first switching field to scanning medium 11 in the direction of the Y-axis establishes an inter-domain wall 16 at one edge thereof and moves the latter in the direction indicated by arrow 25. Similarly, the application of a switching field to scanning medium 11′ in the direction of the X-axis, establishes an inter-domain wall 16′ and moves it in the direction indicated by arrow 25′. The switching fields must be controlled so as to determine the position of respective walls accurately. The interdomain walls produced in both media have concentrated magnetic scanning fields associated therewith, each of said scanning fields being parallel to the Z-axis. Storage medium 12 has an easy direction of magnetization which is parallel to the Z-axis. The spacing of respective scanning media from the storage medium is sufficiently large, due to the thickness of insulating films 13 and 13′ respectively, so that the application to the high coercive force storage medium, of the scanning field originating from a single wall only, is insufficient to reorient the electron spin axes of the storage medium. However, since the scanning fields associated with respective interdomain walls 16 and 16′ reinforce each other where they coincide in the storage medium, the resultant field is large enough to bring about the reorientation of the electron spin axes of the affected area. An inhibiting field parallel to the Z-axis is necessary to prevent writing in unselected areas. With this arrangement, matrix form data storage is possible.

As discussed hereinabove, the direction of rotation of the spin axes of the scanning medium is important in certain situations. The present invention is also applicable to the situation where the storage medium represents a delay line having traversing interdomain walls which are representative of binary digits. Periodically occurring scanning fields are used in order to control the travel of these walls across the storage medium. These scanning fields are created by periodically reversing the electron spin axis orientation at the starting edge of the scanning medium by 180°, an appropriate quadrature field being used to assure spin axis rotation in the same direction.

Successively established interdomain walls have oppositely directed scanning fields associated therewith. Each wall moves along the scanning medium as a result of being displaced by subsequently established walls. As mentioned previously, the scanning fields are then used to control the traversing walls of the storage medium.

Figure 17:
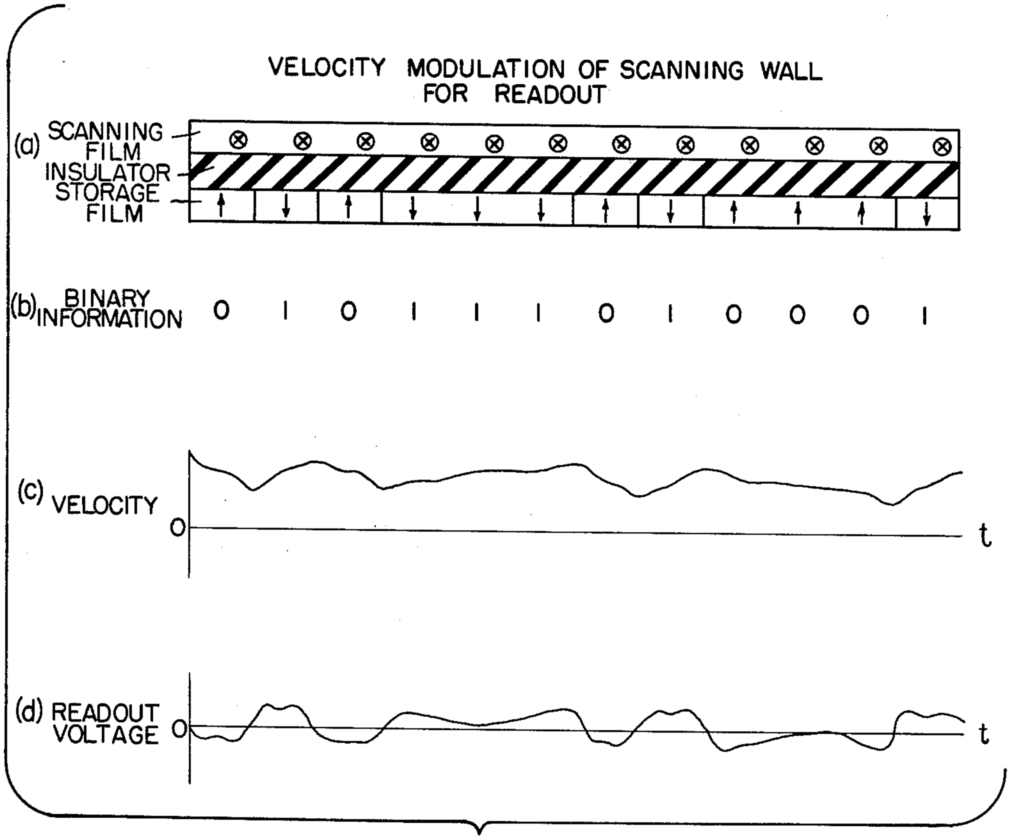
FIG. 17 is a graphical presentation of waveforms plotted to a common time scale derived from a different method of magnetic encoding of binary data.

Velocity modulation of the scanning wall may be used for information readout as illustrated in FIG. 17. In FIG. 17(*a*) the domain configuration is shown for the sequence of binary digits shown in (*b*). By comparing (*a*) and (*b*) it is seen that a binary digit is stored as a pair of antiparallel domains, the sequence up-down representing zero and the sequence down-up representing one. FIG. 17(*c*) shows the modulation of the velocity of the scanning wall that would be expected as a result of the magneto-static interaction between the scanning wall and the information-bearing domains of the storage film. The velocity modulation materializes from the tendency for the scanning wall to move rapidly in passing from the vicinity of a domain with magnetization antiparallel to the scanning wall into the region magnetized parallel to the wall, and the tendency for the wall velocity to decrease in the opposite situation. The average wall velocity will be the same for the case shown as it is for the uniform velocity in the case of a uniformly saturated storage film.

FIG. 17(*d*) shows the time derivative of the velocity in (*c*). A winding 37 wrapped suitably about the sandwich as shown in FIG. 2 will have a voltage induced across the winding terminals 38 proportional to the rate-of-change of the magnetization of the scanning film, and this in turn is proportional to the rate-of-change of the flux of the scanning film linking the winding, and therefore, proportional to the rate of change of velocity of the scanning wall. Thus the waveform of FIG. 17(*d*) represents the voltage across the read-out winding. This waveform is identical, in relation to the binary digit sequence which it represents, to waveforms utilized in the self-clocked reading method described in the above-mentioned co-pending application Serial No. 505,894.

It will be clear from the co-pending application, therefore, that by suitable electronic means, crossover pulses shown in (*e*) can be obtained from the voltage waveform of (*d*). From the crossover pulses, furthermore, the significant crossover pulse gate wave forms shown in (*f*) can be obtained, and these used in conjunction with the crossover pulses yield the gated crossovers shown in (*g*). The gated crossover pulses are seen to represent the original information shown again in (*h*).

The magnetization coding method described in (*a*) of FIG. 17 is similiar to the double-pulse RZ method of recording described in the co-pending application.

FIG. 18(*a*) shows an alternative method of magnetic recording that is similar to the NRZ (non-return to zero) method of magnetic recording. The coded information is shown in (*b*), and the velocity modulation is shown schematically in (*c*). The readout voltage from a sense winding, which is again proportional to the time derivative of the velocity is shown in (*d*). Electronic means that are described in the co-pending application can be used for self-clocked reading of the information.

The techniques discussed herein with respect to a specific embodiment are generally applicable to the other embodiments illustrated and described. Thus, either wall velocity modulation or an inhibiting field may be used in each of the embodiments of the inventions to control the effect of the scan on the data storage medium. Numerous modifications are also possible in the application of the switching fields as discussed herein, such variations being governed by the specific requirements of each situation.

The storage techniques described and illustrated hereinabove, permit a data storage density, both of digital as well as of analog data, far in excess of that possible with present day equipment. These high data storage densities are achieved at no sacrifice in access time. On the contrary, the scanning wall can be made to move with almost arbitrarily great velocity, such velocity being limited by domain rotation for the complete reversal of the film at approximately $10^{-9}$ seconds, rather than by any inherent limitations in the scanning process.

This range of controllable scanning velocities is indicative of the extremely high scanning rate which may be used until the required record is found. But since a much faster scanning rate implies an impossibly high bit rate (from a practical frequency standpoint), the application must employ a much reduced linear bit packing density for the rapidly scanned identifying record tags. When the required record is reached, the scanning rate can be slowed down to take advantage of the high bit densities possible. In this high-capacity, fast access time device, it is necessary that the record tag lengths be dimensionally negligible, in spite of their exaggeration, and that the ratio of scanning rates be large enough so that normal information signals can be eliminated by low pass filtering when the file is being searched.

Having thus described the inventon, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Apparatus for processing data comprising a magnetic scanning medium; a magnetic storage medium positioned to be scanned by the magnetic field of an interdomain wall in said magnetic scanning medium and to magnetically interact directly with said magnetic field; means for establishing an interdomain wall in said magnetic scanning medium and causing said magnetic storage medium and said interdomain wall to move relative to one another; and writing means for selectively controlling the effect of said magnetic field upon the magnetic orientation of said magnetic storage medium to establish therein selected regions of different magnetic orientation in accordance with the data to be stored.

2. Apparatus for reading data out of a magnetic storage medium, said data being stored therein as a plurality of regions of different magnetic orientation, comprising a magnetic scanning medium; means for establishing an interdomain wall in said magnetic scanning medium and causing said magnetic storage medium and said interdomain wall to move relative to one another, said magnetic storage medium positioned to be scanned by the magnetic field of said interdomain wall in said magnetic scanning medium and to magnetically interact directly with said magnetic field; and means for detecting variations in the relative motion of said interdomain wall in said magnetic scanning medium and for generating an output signal representative of the data stored in said magnetic storage medium, said variations arising from the magnetic interaction of said regions in said magnetic storage medium with said magnetic field.

3. Apparatus for processing data comprising a magnetic scanning medium; means for establishing and propagating an interdomain wall in said magnetic scanning medium, said propagated interdomain wall having a magnetic field moving therewith; a magnetic storage medium positioned to be scanned by the moving magnetic field of said propagated interdomain wall in said magnetic scanning medium and to magnetically interact directly with said moving magnetic field; writing means for selectively controlling the effect of said moving magnetic field upon the magnetic orientation of said magnetic storage medium to establish therein selected regions of different magnetic orientation in accordance with the data to be stored; and reading means to generate an output signal representative of the data stored in said magnetic storage medium.

4. The apparatus of claim 3 wherein said reading means includes the aforesaid means for establishing and propagating an interdomain wall in said magnetic scanning medium and in addition includes means for detecting variations in the velocity of propagation of said interdomain wall, the magnetic field of said interdomain wall being unable to change the magnetic orientation of said selected regions in said magnetic storage medium and said variations in the velocity of propagation of said interdomain wall arising from the interaction of said selected regions with said magnetic field.

5. The apparatus of claim 3 wherein said reading means includes the aforesaid means for establishing and propagating an interdomain wall in said magnetic scanning medium, the magnetic field of said interdomain wall being capable of changing the magnetic orientation of said selected regions in said magnetic storage medium; means for applying a magnetic inhibiting field of substantially opposite orientation to the magnetic field of said interdomain wall, said magnetic inhibiting field being sufficiently large to prevent the magnetic field of said interdomain wall from changing the magnetic orientation of said selected regions; and means for detecting variations in the velocity of propagation of said interdomain wall, said variations arising from the interaction of said selected regions with said magnetic field.

6. The apparatus of claim 3 wherein said writing means comprises means for applying and selectively controlling an external magnetic control field in accordance with the data to be stored, said external magnetic control field acting in conjunction with said moving magnetic field to establish said selected regions of different magnetic orientation in said magnetic storage medium.

7. The apparatus of claim 3 wherein said writing means comprises means for selectively controlling the velocity of propagation of said interdomain wall in said magnetic scanning medium to regulate the effect of the magnetic field moving therewith upon the magnetic orientation of said magnetic storage medium.

8. The apparatus of claim 3 wherein said means for establishing and propagating an interdomain wall in said magnetic scanning medium comprises at least one non-magnetic conducting medium tapered in width along the direction of propagation of said interdomain wall and means for passing a time-varying current through said tapered non-magnetic conducting medium to generate a time-varying magnetic field having a gradient along said direction of propagation.

9. The apparatus of claim 3 wherein said magnetic scanning medium is adapted to have a coercive force spatially tapering along the direction of propagation of said interdomain wall, and said means for establishing and propagating an interdomain wall in said magnetic scanning medium comprises at least one non-magnetic conducting medium and means for passing a time-varying current through said non-magnetic conducting medium to generate a time-varying magnetic field.

10. Data processing apparatus comprising a magnetic scanning medium having an easy direction of magnetization; means for generating a time-varying magnetic switching field having a gradient substantially normal to said easy direction of magnetization to establish and propagate an interdomain wall along a given dimension of said magnetic scanning medium, said propagated interdomain wall comprising a transition region between domains of substantially different magnetic orientation in said magnetic scanning medium and having magnetic field moving therewith; a magnetic storage medium having an easy direction of magnetization and positioned to be scanned by the moving magnetic field of said propagated interdomain wall in said magnetic scanning medium and to magnetically interact directly with said moving magnetic field; writing means for selectively controlling the effect of said moving magnetic field upon the magnetic orientation of said magnetic storage medium to establish therein a sequence of oppositely oriented static domains in accordance with the data to be stored; and reading means to generate an output signal representative of the data stored in said magnetic storage medium, said reading means including means for detecting variations in the velocity of propagation of an interdomain wall propagated in said magnetic scanning medium, said variations in the velocity of propagation arising from the interaction of said static domains with the moving magnetic field of the last said interdomain wall.

11. Analog data processing apparatus comprising a magnetic scanning medium; means for generating a time-varying magnetic switching field to establish and propagate an interdomain wall along a given dimension of said magnetic scanning medium, said propagated interdomain wall comprising a transition region between domains of substantially different magnetic orientation in said magnetic scanning medium and having a magnetic field moving therewith; a magnetic storage medium having random directions of magnetization and positioned to be scanned by the moving magnetic field of said interdomain wall in said magnetic scanning medium and to magnetically interact directly with said moving magnetic field; writing means for selectively controlling the effect of said moving magnetic field upon the magnetic orientation of said magnetic storage medium to give some of the electron spin axes of said magnetic storage medium varying degrees of rotation toward the field direction of said moving magnetic field and to establish thereby static regions of varying magnetic strengths, the degree of alignment of the electron spin axes of said static regions relative to the field direction of said moving magnetic field being proportional to the magnitude of said analog data; and reading means to generate an output signal representative of the analog data stored in said magnetic storage medium.

12. Data processing apparatus comprising a magnetic scanning medium; means for generating a magnetic switching field to establish an interdomain wall in said magnetic scanning medium, said interdomain wall comprising a transition region between domains of substantially different magnetic orientation in said magnetic scanning medium; a magnetic storage medium positioned to magnetically interact directly with the magnetic field of said interdomain wall, said magnetic storage medium and said magnetic scanning medium each comprising a film deposited on the surface of a supporting tape; means for moving said supporting tape relative to said magnetic switching field; writing means for selectively controlling the effect of the magnetic field of said interdomain wall in said magnetic scanning medium upon the magnetic orientation of the moving magnetic storage medium to establish therein regions of different magnetic orientation in accordance with the data to be stored; and reading means to generate an output signal representative of the data stored in said magnetic storage medium.

13. Data processing apparatus comprising a substrate; a first non-magnetic conductive film tapered along its length and deposited on said substrate; a first insulation film disposed intermediate said first conductive film and a second non-magnetic conductive film, each of said conductive films having a terminal strip joined to opposite edges thereof; current connections on each of said terminal strips; a second insulation film disposed intermediate said second conductive film and a magnetic scanning medium, said magnetic scanning medium having an easy direction of magnetization; means for applying oppositely directed electric currents to separate ones of said conductive films and means for varying at least one of said currents in time to generate a time-varying magnetic switching field having a gradient normal to said easy direction of magnetization to establish and propagate an interdomain wall in said magnetic scanning medium, said propagated interdomain wall having a magnetic field moving therewith; a third insulation film disposed intermediate said magnetic scanning medium and a magnetic storage medium, said magnetic storage medium having an easy direction of magnetization and positioned to magnetically interact directly with the moving magnetic field of said propagated interdomain wall; writing means for selectively controlling the magnitude of one of said time-varying currents in accordance with an input signal to regulate the effect of said moving magnetic field upon the magnetic orientation of said magnetic storage medium to establish domains therein representative of the data to be stored; erasing means for reversing the direction of said currents; and reading means to generate an output signal representative of the data stored in said magnetic storage medium, said reading means including means for detecting variations in the velocity of propagation of an interdomain wall propagated in said magnetic scanning medium.

14. The apparatus of claim 1 wherein said magnetic scanning medium comprises an anisotropic non-uniform magnetic medium containing therein at least one nucleus of reproducible random interdomain walls.

References Cited in the file of this patent

UNITED STATES PATENTS

| | | |
|---|---|---|
| 2,443,756 | Williams et al. | June 22, 1948 |
| 2,643,130 | Kornei | June 23, 1953 |
| 2,722,676 | Begun | Nov. 1, 1955 |
| 2,792,563 | Rajchman | May 14, 1957 |
| 2,811,710 | Demer | Oct. 29, 1957 |
| 2,889,542 | Goldner | June 2, 1959 |
| 2,919,432 | Broadbent | Dec. 29, 1959 |

OTHER REFERENCES

"Preparation of Thin Magnetic Films and Their Properties" (Blois, Jr.), Journal of Applied Physics, vol. 26, No. 8, August 1955, pp. 975–980.

The Utilization of Domain Wall Viscosity in Data-Handling Devices" (Newhouse), Proceedings of the I.R.E., November 1957, pp. 1484–1492.

"Isotropic Thin Film Memory Device" (Eggenberger), I.B.M. Technical Disclosure Bulletin, vol. 2, No. 1, June 1959, page 29.